3,481,849
PROCESS FOR PREPARING SULFONIC ACIDS

Claus Beermann, Neu-Isenburg, Herbert Ramloch, Kelkheim, Taunus, and Sigurd Rosinger, Frankfurt am Main, Germany, assignors to Farbwerke Hoechst Aktiengesellschaft vormals Meister Lucius & Bruning, Frankfurt am Main, Germany, a German corporation
No Drawing. Filed June 1, 1966, Ser. No. 554,366
Claims priority, application Germany, June 11, 1965,
F 46,302
Int. Cl. B01j 1/10
U.S. Cl. 204—162          3 Claims The present invention relates to a process for preparing sulfonic acids.

It is known from German Patent 1,139,116 to prepare sulfonic acids by exposing a mixture of paraffin hydrocarbons containing 10 to 30 carbon atoms and a gas mixture of sulfur dioxide and oxygen to the continuous action of gamma rays. According to F. Asinger, "Chemie und Technologie der Paraffinkohlenwasserstoffee," Berlin 1956, two groups of paraffin hydrocarbons are distinguished, one of which comprises hydrocarbons that continue to react automatically with sulfur dioxide and oxygen to yield sulfonic acids as soon as the reaction has been initiated by irradiation, introducing ozone or adding per-acids. Members of this group are cyclohexane, methyl cyclohexane and heptane. The compounds of the other groups, which mainly comprises high molecular weight paraffin hydrocarbons, only react with sulfur dioxide and oxygen when they are continuously subjected to one of the aforesaid modes of action.

It is, furthermore, known that in the case of the last-mentioned group of hydrocarbons the reaction can be continued, after the source of ultraviolet radiation has been removed or the supply of ozone has been interrupted, by adding continuously small quantities of acetic anhydride to the mixture of hydrocarbons; however, the impurification with acetic acid is, inter alia, a disadvantage of this process.

Now we have found a process for preparing sulfonic acids by reacting straight-chain saturated hydrocarbons containing 10 to 30 carbon atoms with sulfur dioxide and oxygen, which comprises purifying the hydrocarbons and then initiating the reaction by the action of high energy ionizing radiation or ultraviolet radiation or by the introduction of ozone or the addition of peroxy compounds, and continuing the reaction wthout further supply of energy or compounds suitable for starting chain reactions.

The straight chain saturated hydrocarbons containing 10 to 30 carbon atoms in the molecule are prepared from suitable paraffin fractions by means of molecular sieve separating processes. Molecular sieves are, for example, certain synthetic zeolites whose crystal lattices have interspaces of defined dimensions which, on their part, are accessible through pores having a defined width. These pores render possible, for example, an internal adsorption of n-paraffins with the exclusion of branched components. The n-paraffins are then desorbed and collected in a separate stage (cf. W. F. Acery, M. N. Y. Lee "Das Iso-Siv-Verfahren zur Abtrennung von n-Paraffinen," Erdöl, Kohle 15, 356 (1962)). The straight chain paraffin hydrocarbons can also be separated by the urea process (cf. Sherwood P. L., Chim. et Ind. 1954, pp. 81 through 84).

The purification of the straight chain paraffin hydrocarbons, which is an essential feature of the process of the present invention, shall remove residues of unsaturated, cyclic and aromatic hydrocarbons. The purification is advantageously carried out by mixing the hydrocarbons intimately with sulfuric acid containing sulfur trioxide having an $SO_3$ content of up to 80 percent, preferably 15 to 30 percent, at temperatures within the range of the solidification temperature of the hydrocarbon mixture and 100° C., preferably within the range of 20° to 80° C. The periods during which the sulfuric acid is caused to act upon the hydrocarbons may range from 1 minute to 3 hours. The amounts of sulfuric acid containing sulfur trioxide to be applied depends on the degree of purity of the hydrocarbon mixture; 100 ml. of sulfuric acid containing 20 percent of sulfur trioxide are generally sufficient for 1 liter of the hydrocarbon mixture. After the sulfuric acid has acted upon the hydrocarbons, the sulfuric acid phase is separated from the clear hydrocarbon phase. The latter can be used without further after-treatment for the process of sulfoxidation.

The preparation of sulfonic acids of the aforementioned hydrocarbons can be carried out at temperatures within the range of the solidification temperature of the hydrocarbon mixture used and 50° C., preferably at temperatures ranging from room temperature to 35° C. The pressures applied may range from 0 to 50 atmospheres gage, preferably from 0 to 5 atomspheres gage. The gas mixture of sulfur dioxide and oxygen is advantageously applied in a large surplus in which case the volume of the gas mixture passed through per hour may attain 10 to 1000 times, preferably 50 to 500 times, the volume of the paraffin hydrocarbons used. According to the reaction equation, the ratio sulfur dioxide:oxygen shall be at least 2:1; it is advantageous to use gas mixtures having a higher content of sulfur dioxide in a ratio within the range of 4:1 to 20:1; mixing ratios within the range of 5:1 to 15:1 being especially advantageous.

It is preferred to use oxygen; however, air may also be used. It is advantageous to introduce the gas mixture in fine dispersion, for example by means of an annular device or a frit, into the reaction mixture.

As high energy ionizing radiation there can be used, for example, gamma radiation with a low dosage rate of about $10^2$ rad./hour as well as with a high dosage rate of several M rad./hour. Radiations of this type can be obtained from a cobalt 60 source of 50 to 500,000 curies. It is also possible to use the beta radiation of radionuclides, for example of strontium 90, the radiation of spent fuel elements of nuclear reactors or the radiation of a nuclear reactor itself. Still further it is possible to use X-rays or electrons rich in energy from accelerators or ultraviolet rays for initiating the reaction. Instead of high energy ionizing radiation there can be used, moreover, ozone or oxygen containing ozone or the peroxy compounds known therefor, such as saturated aliphatic per-acids, for example per-acetic acid, such as per-sulfonic acids, for example, cyclohexyl-persulfonic acid. The use of acetyl-cyclohexanesulfonyl-peroxide is especially advantageous.

On principle, the process according to the invention may be carried out either discontinuously or continuously. In the discontinuous process the reaction, which has been initiated by radiation, ozone or by per-oxy compounds, is continued—after the external measures for initiating the reaction have been discontinued—with furthere introduction of the reaction gas mixture until the paraffin hydrocarbons in the reaction vessel have reacted quantitatively.

However, the continuous process is preferred. To carry out the continuous mode of execution of the process, the gas mixture is conducted in a cycle, and the gases consumed by the reaction are continuously replaced by the introduction of new sulfur dioxide and oxygen in a manner such that the amount and the composition of the gas mixture in the cycle remain constant. At the same time the reaction solution containing the sulfonic acid is drawn off at the bottom of the reaction vessel and a corresponding amount of fresh, purified paraffin hydrocarbons is introduced at the head of the reaction vessel. The time of stay of the hydrocarbons in the reaction vessel amounts preferably to 30 to 180 minutes.

Shortly after the reaction has been initiated by the aforementioned measures the reaction solution becomes turbid. The measures used for initiating the reaction are advantageously continued until the first drops of sulfonic acid separate from the reaction solution. This is generally the case after 15 to 50 minutes; further external initiating measures are no longer required thereafter.

The sulfonic acids are then extracted from the reaction solution containing sulfonic acid, which solution has been drawn off at the bottom of the reaction vessel. This may be effected, for example, with the aid of a mixture of methanol and water whose composition may vary within wide limits but which consists preferably of about equal parts by volume. The extraction may also be carried out with an aqueous solution of sulfonic acid from a previous batch. Still further, it is possible to carry out the extraction only by means of water; in the case of low concentrations of sulfonic acid there may form emulsions in this process which can be avoided if the process is carried out with aqueous solutions of sulfonic acid which contain more than 10 percent of sulfonic acid. The acqueous extract of sulfonic acid obtained in this manner is advantageously conducted in a cycle, part thereof is separated for further extraction and the other part is adjusted with water to the suitable content of sulfonic acid. The mixture of paraffin hydrocarbons remaining behind in the process of extraction can be recycled into the reaction vessel after the drying process, for example over molecular sieves or chemical drying means such as concentrated sulfuric acid.

The further treatment of the aqueous extracts containing sulfonic acid may be carried out, for example, by evaporating the sulfur dioxide in vacuo, separating the dissolved hydrocarbon residues by distillation by steam and neutralizing the solution of sulfonic acid which may contain minor amounts of sulfuric acid.

The sulfonic acids in the reaction solution can also be extracted by means of liquid sulfur dioxide in which case the recovered mixture of hydrocarbons can be recycled into the reaction vessel without further after-treatment.

According to the process of the present invention it is possible to conduct the reaction, after it has been initiated, in a continuous manner with the permanent supply of the reactants in a corresponding composition without the further use of external measures for initiating the reaction.

It has already been proposed to use high energy ionizing radiation, such as gamma rays or beta rays, for starting the sulfonation reaction while using hydrocarbons that have not especially been purified. However, when using the especially purified hydrocarbon mixtures according to the present invention, considerably lower periods for initiating the reaction are required. Especially when working according to the continuous mode of execution of the process of the present invention, higher space-time yields are obtained than in the case of using hydrocarbons that have not been purified. With this process it is possible, moreover, to initiate the sulfonation reaction also by means of ultraviolet radiation, by introducing ozone or adding peroxy compounds and to continue the reaction after a short time without further external measures.

The salts of the long-chain sulfonic acids are used, for example, as detergents that can be decomposed biologically.

The following examples serve to illustrate the invention, but they are not intended to limit it thereto.

EXAMPLE 1

(a) A petroleum fraction with hydrocarbons containing 13 to 19 carbon atoms in the molecule was substantially freed of unsaturated branched and cyclic hydrocarbon constituents by means of a molecular sieve of synthetic zeolites. The portion passing through the molecular sieve had a medium molecular weight of 216 and still had a residual content of 0.05% of aromatic substances (calculated on toluene); its iodine number was 0.03. 1 liter of this hydrocarbon mixture was stirred vigorously, at 60° C. for one, hour, with 100 ml. sulfuric acid containing 20% sulfur trioxide. Then the hydrocarbon phase was separated from the sulfuric acid phase.

(b) The apparatus used consisted of a vertical glass tube with installed thermometer and a spiral glass tube connected to a thermostat. At a distance of about 5 cm. from the lower end of the tube, a frit was installed (cf. R. Graf, Liebig's Annalen 578, 64 (1952), FIG. 1). 540 ml. of the mixture of paraffin hydrocarbons, which had been purified as described above, were introduced into this tube and, at 30° to 32° C., 5 liters/hour of ozonized oxygen with a content of 3.3% ozone and 25 liters/hour sulfur dioxide were introduced by means of a frit. After 40 minutes, about 0.5 ml. sulfonated hydrocarbons had separated on the bottom of the reaction vessel, whereupon the ozonizer was switched off. Then 360 ml./hour of a purified mixture of paraffin hydrocarbons were fed in at the head of the tube, while at the lower end of the tube the corresponding amount of reaction product was drawn off. The time of stay of the mixture of hydrocarbons, therefore, amounted to 1.5 hours. The reaction was continued by means of the thermostat at a temperature of 30° to 32° C. The course of the reaction was tested by determining the acid number in the reaction product; for this purpose there was used a portion of the reaction mixture that had been degassed under reduced pressure of about 10 mm. Hg at room temperature. After about 1.5 hours the determination of the acid number yielded uniform values.

The crude sulfonation product drawn off at the lower end of the tube was extracted by agitation with a mixture of methanol-water in a proportion by volume of 1:1. The methanol and the dissolved sulfur dioxide were removed from the aqueous extract by distillation under reduced pressure of about 10 mm. Hg. In the residue the surface-active substance was determined by the methylene blue method (cf. D. Hummel, "Analyse der Tenside," pp. 187–188, C. Hanser Verlag, Munich 1962). The space/time yield of surface-active substance (calculated on $RSO_3Na$, at a medium molecular weight of 318) that could be detected by the methylene-blue determination amounted to 35 grams per liter and per hour.

EXAMPLE 2

This test was carried out in the same manner as that described under 1a and 1b with the exception that the ozonizer was switched off after a period of 10 minutes already. After the lapse of these 10 minutes, 360 ml./hour of a purified mixture of paraffin hydrocarbons was fed in at the head of the tube while at the lower end of the tube the corresponding amount of reaction product was drawn off. According to the records of the determinations of the acid number, the state of equilibrium of the reaction was attained after about 4 hours only. Also in this case, the space/time yield, under otherwise identical conditions, was the same as that indicated under 1b.

EXAMPLE 3

In the tube described under 1b, there were introduced by means of a frit, at 30° to 32° C., 5 liters/hour oxygen and 25 liters/hour sulfur dioxide into 540 ml. of a purified mixture of hydrocarbons containing 13 to 19 carbon atoms in the molecule. The reaction mixture was irradiated with the rays of an ultra-violet lamp. After 35 minutes the ultraviolet lamp was removed, and 360 ml./hour of a mixture of purified paraffin hydrocarbons was fed in at the head of the tube, while at the lower end of the tube the corresponding amount of reaction product was drawn off. The space/time yield of surface-active substance (calculated on $RSO_3Na$ at a medium molecular weight of 318) that could be detected by the methylene blue determination amounted to 33 grams per liter and per hour.

EXAMPLE 4

In the tube described under 1b, there were introduced by means of a frit, at 30° to 32° C., 5 liters/hour oxygen and 25 liters/hour sulfur dioxide into 540 ml. of a mixture of purified paraffin hydrocarbons. Simultaneously, 5 ml. of a solution of 25% strength of acetyl-cyclohexane sulfonyl-peroxide were introduced dropwise into acetonitrile, during the course of 10 minutes. After the lapse of 10 minutes, the reaction solution had become turbid, and after the lapse of another 10 minutes 360 ml./hour of a mixture of purified paraffin hydrocarbons were fed in at the head of the tube, while at the lower end of the tube the corresponding amount of reaction product was drawn off. After the lapse of about 2.5 hours, the determination of the acid number yielded uniform values. The space/time yield of surface-active substance (calculated on $RSO_3Na$ at a medium molecular weight of 318) that could be detected by the methylene blue determination amounted to 35 grams per liter and per hour.

We claim:

1. A process for preparing sulfonic acids by reacting straight-chain saturated hydrocarbons containing 10 to 30 carbon atoms with sulfur dioxide and oxygen, which comprises first purifying the hydrocarbons with sulfuric acid containing sulfur trioxide, then initiating the reaction by the action of high energy ionizing radiation or ultraviolet light or by the addition of ozone or peroxy compounds, and continuing the reaction without further supply of radiation energy or compounds suitable for starting chain reactions.

2. The process as claimed in claim 1, wherein straight-chain saturated hydrocarbons are obtained by means of the molecular sieve- or urea-process and wherein the said hydrocarbons are submitted to further purification with sulfuric acid containing 15 to 30 percent sulfur trioxide.

3. The process as claimed in claim 1, wherein the sulfoxidation process is carried out continuously in such a manner that the time of stay of the hydrocarbons in the reaction mixture is within the range of from 30 to 180 minutes.

References Cited

UNITED STATES PATENTS 2,702,273  2/1955  Kennedy _____ 204—162 X
3,372,188  3/1968  Alston et al. _____ 260—503

FOREIGN PATENTS 942,503  11/1963  Great Britain.

HOWARD S. WILLIAMS, Primary Examiner

U.S. Cl. X.R.

260—513